(12) United States Patent
Shen et al.

(10) Patent No.: US 6,683,983 B1
(45) Date of Patent: Jan. 27, 2004

(54) DOCUMENT-INCLINATION DETECTOR

(75) Inventors: Xueming Shen, Amimachi (JP);
Kagenori Nagao, Amimachi (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 09/515,331

(22) Filed: Feb. 29, 2000

(30) Foreign Application Priority Data

Mar. 1, 1999 (JP) .......... 11-052616

(51) Int. Cl.$^7$ .............. G06K 9/36
(52) U.S. Cl. .......... 382/168; 382/290; 358/452
(58) Field of Search ............. 382/168, 289, 382/290; 358/452

(56) References Cited

U.S. PATENT DOCUMENTS

| 4,251,799 A | | 2/1981 | Jih |
| 5,001,766 A | | 3/1991 | Baird |
| 5,506,918 A | | 4/1996 | Ishitani |
| 5,696,841 A | * | 12/1997 | Nakatsuka .......... 382/174 |
| 5,781,660 A | | 7/1998 | Nitta et al. |
| 5,923,790 A | * | 7/1999 | Miwa et al. .......... 382/289 |
| 6,249,353 B1 | * | 6/2001 | Yoshida et al. .......... 358/1.9 |
| 6,266,441 B1 | * | 7/2001 | Hashimoto et al. .......... 382/170 |

FOREIGN PATENT DOCUMENTS

| JP | 55-135972 | * | 10/1980 |
| JP | 61-160180 | * | 7/1986 |
| JP | 62-52337 | | 11/1987 |
| JP | 63-25391 | * | 5/1988 |
| JP | 63-292382 | | 11/1988 |
| JP | 2-44486 | | 2/1990 |
| JP | 3-90980 | * | 4/1991 |
| JP | 3-212780 | * | 9/1991 |
| JP | 4-177583 | * | 6/1992 |

OTHER PUBLICATIONS

Goto et al, A framework for detecting and selecting text line candidates of correct orientation, Proceedings of the Fourteenth International Conference on Pattern Recognition, Aug. 16–20, 1998, vol. 2, p. 1074–1076.*

Lehal et al, A range free skew detection technique for digitized Gurmukhi script documents, Proceedings of the Fifth Annual International Conference on Document Analysis and Recognition, Sep. 20–22, 1999, p 147–152.*

Abstract and selected figures of JP404205074A.*

Abstract and selected figures of JP362274382A.*

Abstract and selected figures of JP358072275A.*

Abstract and selected figures of JP363108479A.*

PTO 03–1450, Translation of Tsuji (JP 03–090980 A, Apr. 1991).*

PTO 03–1452, Translation of Murayama (JP 04–177583, Jun. 1992).*

PTO 03–1482, Translation of Tashiro (JP 3–212780, Sep. 1991).*

(List continued on next page.)

Primary Examiner—Bhavesh M. Mehta
Assistant Examiner—Christopher Sukhaphadhana
(74) Attorney, Agent, or Firm—Nixon Peabody LLP; Donald R. Studebaker

(57) ABSTRACT

A document-inclination detector having a marginal distribution extraction section which extracts a horizontal marginal distribution and a vertical marginal distribution for the document image, a line-direction detection section which recognizes the line direction of each character string of the document image, a marginal distribution correction section which performs a threshold detection on the marginal distribution projected in the line direction, and an inclination detection section which detects the inclination of the line direction of the document image.

8 Claims, 3 Drawing Sheets

OTHER PUBLICATIONS

PTO 03–1483, Translation of Akiyama et al (JP 63–25391, Mar. 1982).*

PTO 03–1484, Translation of Hiramatsu et al (JP 55–135972, Oct. 1980).*

PTO 03–1485, Translation of Akiyama (JP 61–160180, Jul. 1986).*

Thesis Journal for IECE, "A Segmentation Method for Document Images without the Knowledge of Document Formats", 1983/1, vol. J66–D, No. 1, pp. 111–118.

55–135972, Patent Abstracts of Japan, Oct. 23, 1980.

61–160180, Patent Abstracts of Japan, Jul. 19, 1986.

European Search Report, Jun. 11, 2001.

* cited by examiner

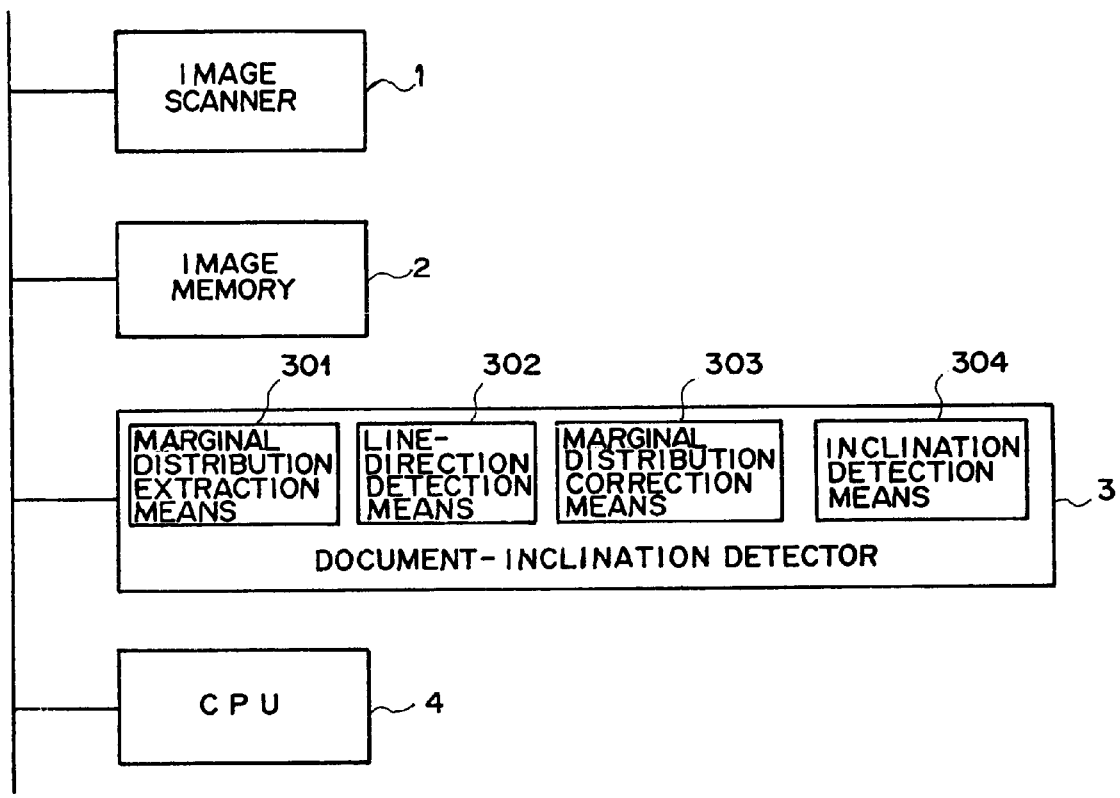
F I G . 1

F I G. 4A
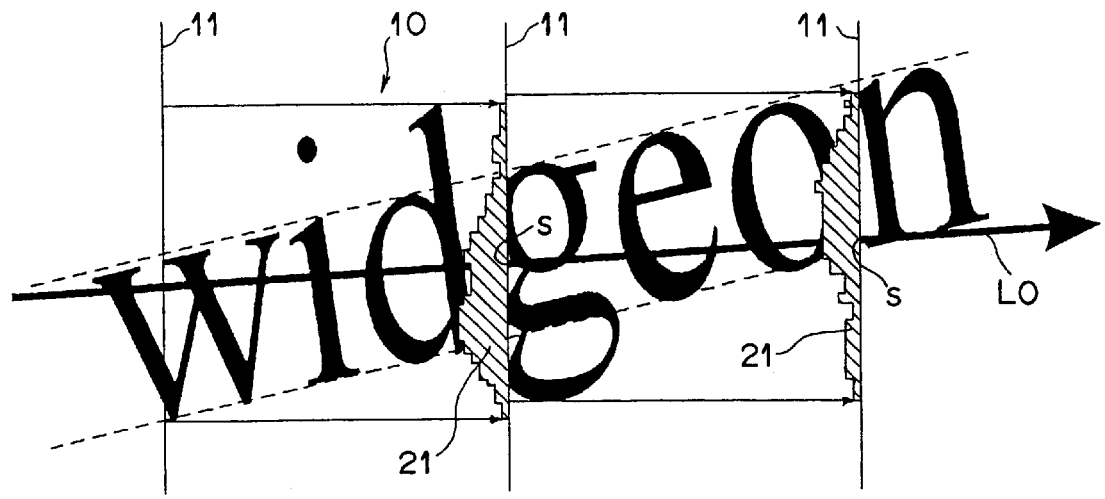
F I G. 4B
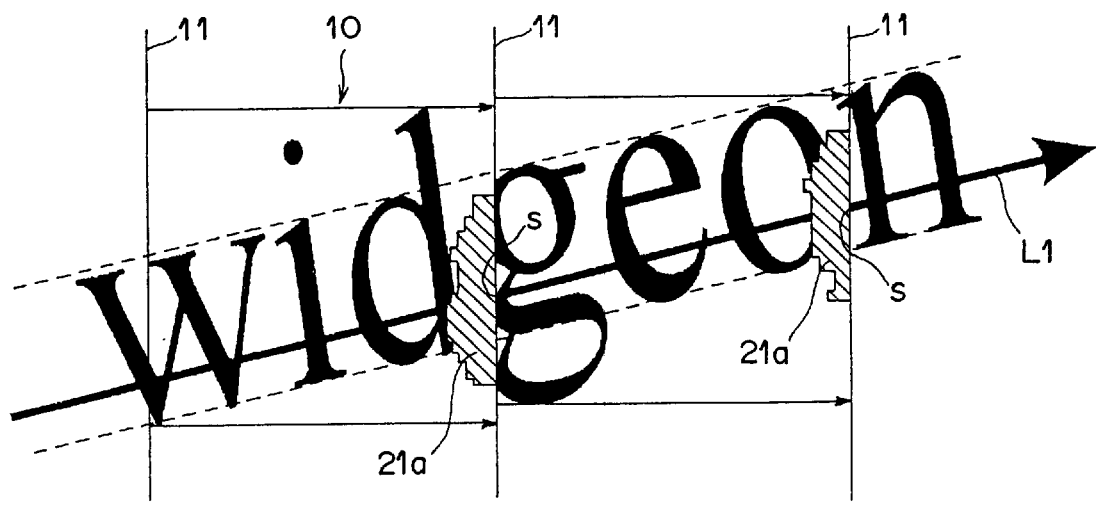

DOCUMENT-INCLINATION DETECTOR

BACKGROUND OF THE INVENTION

1. Field of the Invention

The present invention relates to a document-inclination detector, and more particularly to a document-inclination detector that detects the inclination of an input image in a digital image processor, such as an optical character reader (OCR), which processes a document image in a page unit. The "document image" means document data in a form of electronic image obtained by reading out the original which is a printed material by use of an image scanner or the like.

2. Description of the Related Art

For example, in processing a document image using an is OCR, there are cases where the input image inclines, for example, due to the inclination of the original with respect to an image scanner that reads the document image. To accurately perform character recognition and the like on the inclined document image as well, the inclination of the input image needs to be corrected, or taking the inclination into consideration becomes necessary in the subsequent processes. For this reason, the inclination of a document image is detected.

As a method of detecting the inclination of a document image, (1) a method which rotates a document image for each very small angle to obtain a marginal distribution and takes the angle of rotation as the inclination of the manuscript when the distribution is the sharpest (Research Report for Institute of Electronics and Communication Engineers of Japan (IECE), PRL 80-70, pp. 9–16), (2) a method which calculates a space distribution for characters or character strings of an original using a two-dimensional Fourier transformation and estimates the angle of inclination from the space distribution (Thesis Journal for IECE, 1984/11, Vol. 670, No. 9, pp. 1044–1051), (3) a method which divides a document image into a plurality of parallel strip areas substantially perpendicular to the line direction, calculates a partial marginal distribution for each strip area, and detects the angle of inclination from the phase shift among the peak points of the marginal distributions for adjacent strip areas (Thesis Journal for IECE, 1983/1, Vol. J66-D, No. 1, pp. 111–118), etc., have been proposed.

Furthermore, a technique that calculates the sum of the absolute values of differences between density cumulated values appearing on adjacent scanning lines in a marginal distribution obtained by the scanning operation in the direction substantially perpendicular to the line direction of the document original and corrects the inclination so that the sum becomes maximum (Japanese Patent Publication Nos. 62(1987)-52337 and 63(1988)-25391), a technique that divides a document image into strip areas with two or more widths, obtains images projected to the strip areas, and detects the angle of inclination from a difference between the widths of the strip areas and from a variation between the projected images (Japanese Unexamined Patent Publication No. 63(1988)-292382), a technique that puts a character into graphical representation by the circumscribed rectangular or marginal distribution and detects the inclination of the graphically represented character array from the relation of array position adjacent to the area of the graphically represented character (Japanese Unexamined Patent Publication No. 2(1990)-44486), a technique that extracts marginal distributions from a plurality of parts of a character string, estimates the position of the character string from each marginal distribution, and estimates the inclination of the entire character string (Japanese Unexamined Patent Publication No. 3(1991)-212780), etc., are known.

In the aforementioned methods, however, complicated processes, which consume time, such as the image rotating process and the two-dimensional Fourier transformation, are needed. Also, the process of calculating a great number of marginal distributions and comparing them is needed, and because of simplification of this process, there is a problem that accuracy of inclination detection will be reduced.

In addition, in the case where the line direction of an original, i.e., vertical or horizontal writing, is known in advance, some of the principles of detection are applicable, but with respect to an original whose line direction of a character string is unknown and an original including both vertical writing and horizontal writing, the phase shift between partial marginal distributions become obscure and in some of the methods the detection of inclination becomes difficult. Furthermore, some of the methods are not applicable because the characteristics of the marginal distribution varies between a Japanese document original and an alphabetic document original, and in other methods, errors in the detection of inclination will become serious.

SUMMARY OF THE INVENTION

In view of the foregoing observations and description, the primary object of the present invention is to provide a document-inclination detector which is capable of detecting the inclination of a document image in Japanese and European languages at high speeds with a high degree of accuracy, regardless of whether the originals are written horizontally or vertically.

To achieve the aforementioned object and in accordance with the present invention, there is provided a document-inclination detector comprising marginal distribution extraction means which divides an input document image into a plurality of small areas by a plurality of vertical dividing lines and extracts a horizontal marginal distribution obtained by projecting each small area in a horizontal direction and also divides the input document image into a plurality of small areas by a plurality of horizontal dividing lines and extracts a vertical marginal distribution obtained by projecting each small area in a vertical direction, the horizontal marginal distribution being constituted by histograms obtained by projecting character strings of the document image in the horizontal direction and the vertical marginal distribution being constituted by histograms obtained by projecting the character strings in the vertical direction, line-direction detection means which detects a line direction of the document image by comparing the horizontal marginal distribution and vertical marginal distribution extracted by the marginal distribution extraction means, marginal distribution correction means which corrects the histograms of the marginal distribution projected in the same direction as the line direction detected by the line-direction detection means, and inclination detection means which detects inclination of the document image from a phase shift between the corrected histograms adjacent to each other.

Therefore, detection of inclination can be performed, whether an original is written vertically or horizontally. By correcting only the histograms of the marginal distribution projected in the direction required for inclination detection and detecting inclination, the process can be simplified.

Furthermore, since each histogram of the marginal distribution is corrected, for example, in view of the characteristics of an alphabetic character string, the inclination of an alphabetic document image as well as a Japanese document image can be detected with a high degree of accuracy, and the judgement of the line direction and the detection of the inclination can be generally performed synthetically at high speeds with a high degree of accuracy.

Particularly, the complexity of the inclination detection of a document image has been improved, by employing a simple method of detection which extracts the partial marginal distributions for the character strings of the document image and detects the inclination of the document image from the phase shift between the corrected histograms adjacent to each other. Moreover, in the case where information on the line direction of an original is not given, or in the case where an original includes both vertical writing and horizontal writing, the detection of the line direction is performed before detecting the inclination and only the marginal distribution data in the detected line direction is employed. In this way, further simplification of the inclination detection can be achieved.

In a preferred form of the present invention, the line-direction detection means compares the number of histograms between periodic blanks in the horizontal marginal distribution with the number of histograms between periodic blanks in the vertical marginal distribution and judges that the projection direction of the marginal distribution in which the number of histograms between periodic blanks is greater is the line direction. Also, the line-direction detection means may compare the number of periodic blanks in the horizontal marginal distribution with the number of periodic blanks in the vertical marginal distribution and may judge that the projection direction of the marginal distribution in which the number of periodic blanks is greater is the line direction. Therefore, a judgement of the line direction suitable for inclination detection can be made with respect to an original, including both vertical writing and horizontal writing.

In another preferred form of the present invention, the inclination detection means detects the inclination of the document image from the inclination of a straight line linking the central points of a plurality of the corrected histograms belonging to the same character string. Therefore, the inclination detection can be performed accurately at high speeds. Also, the inclination detection means may detect the inclination of the document image from the inclination of a straight line linking the central points of the corrected histograms belonging to a plurality of character strings. In this case, inclination is detected based on as many corrected histograms as possible over a plurality of character strings. As a result, more accurate results are obtainable.

In still another preferred form of the present invention, the marginal distribution correction means performs a threshold detection (clipping process) on an end portion of each histogram of the marginal distribution projected in the same direction as the line direction, thereby removing the end portion when a level on the end portion is less than a predetermined threshold value. Therefore, with respect to an alphabetic document, in which letters are not uniform in size, a high degree of inclination detection can be performed, the same as for a Japanese document.

BRIEF DESCRIPTION OF THE DRAWINGS

FIG. 1 is a block diagram showing a system with a document-inclination detector according to an embodiment of the present invention, FIG. 4A is a diagram showing the inclination of a character string obtained before correcting the marginal distribution, FIG. 4B is a diagram showing the inclination of a character string obtained after correcting the marginal distribution.

DESCRIPTION OF THE PREFERRED EMBODIMENTS

Figure 2A:
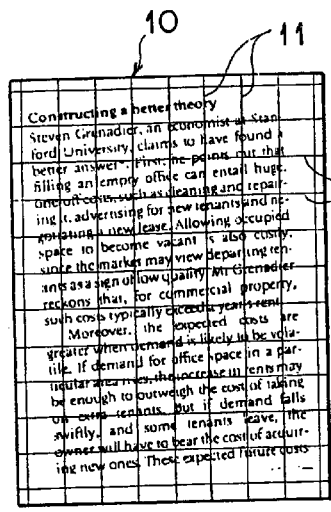
FIG. 2A is a diagram showing an example of a document image.

A preferred embodiment of a document-inclination detector according to the present invention will hereinafter be described in detail with reference to the drawings.

FIG. 1 shows the entire construction of a document image processing system with the document-inclination detector of the present invention. The document image processing system includes an image scanner 1 which inputs a document original as digital image data, image memory 2 which stores the data of the input document image, the document-inclination detector 3 which detects the inclination of the document image, and a central processing unit (CPU) 4 which controls the entire system.

The document-inclination detector 3 comprises marginal distribution extraction means 301 which extracts a horizontal marginal distribution and a vertical marginal distribution for the document image, line-direction detection means 302 which recognizes the line direction of each character string of the document image, marginal distribution correction means 303 which performs a threshold process on the marginal distribution projected in the line direction, and inclination detection means 304 which detects the inclination of the line direction of the document image.

The marginal distribution extraction means 301 extracts two kinds of partial horizontal and vertical marginal distributions for character strings from the digital document image data (see FIG. 2A to be described later) stored in the image memory 2. That is, the document image is divided into a plurality of small strip areas by vertical dividing lines and each strip area is projected in the horizontal direction, whereby a horizontal marginal distribution is extracted (see FIG. 2B). Similarly, the document image is divided into a plurality of small strip areas by horizontal dividing lines and each strip area is projected in the vertical direction, whereby a vertical marginal distribution is extracted (see FIG. 2C). The extracted vertical and horizontal marginal distributions are sent to the line-direction detection means 302 which recognizes the line direction of the character string.

The line-direction detection means 302 compares the vertical and horizontal marginal distributions, thereby estimating the line direction of the character string of the input document image, i.e., whether the character string is vertical writing or horizontal writing. More specifically, the number of histograms (to be described later) between periodic blanks in the vertical marginal distribution (or the number of periodic blanks in the vertical marginal distribution) is compared with the number of histograms between periodic blanks in the horizontal marginal distribution (or the number of periodic blanks in the horizontal marginal distribution), and the direction of projection of the marginal distribution in which the number of histograms between periodic blanks (or the number of periodic blanks) is greater is judged to be the line direction. The result is sent to the marginal distribution correction means 303.

The marginal distribution correction means 303 performs a marginal distribution correcting process on the vertical or horizontal marginal distribution projected and obtained in the same direction as the line direction estimated by the line-direction detection means 302. With the marginal distribution correcting process, an end portion of each histogram of the marginal distribution is removed when a level on the end portion is less than a predetermined threshold value. The result is sent to the inclination detection means 304.

The inclination detection means 304 detects the inclination of each character string from the phase shift between the corrected histograms of the marginal distribution adjacent to one another. More specifically, the central points of a plurality of corrected histograms for the same character string are linked and formed into a line by a method of least square and the inclination of the line is calculated for each of a plurality of character strings. The average value of the inclinations of the plurality of character strings is detected as the inclination of the input document image. The detected inclination of the document image is sent to the CPU 4 and used in the subsequent processes.

Figure 2B:
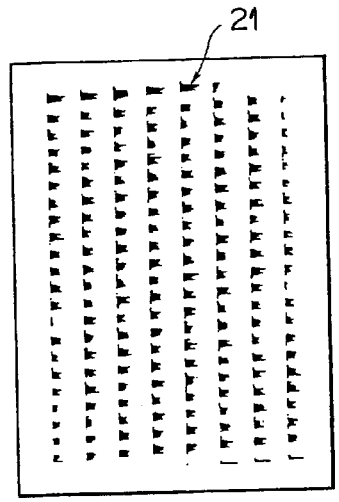
FIG. 2B is a diagram showing horizontal marginal distributions obtained from the document image shown in FIG. 2A.

Each operation will hereinafter be described in detail with the horizontally written document image, shown in FIGS. 2 to 4, as an example. FIG. 2A shows a horizontally written alphabetic document image 10 inclined (input image data). The marginal distribution extraction means 301 divides this document image 10 into a plurality of parallel strip areas in the vertical and horizontal directions and extracts partial horizontal and vertical marginal distributions for the character strings for each strip area. More specifically, the document image 10 is divided into 8 parallel strip areas extending in the vertical direction by vertical dividing lines 11. Each vertical strip area is projected in the horizontal direction, whereby a horizontal marginal distribution 21 is extracted as shown in FIG. 2B. The document image 10 is also divided into 11 parallel strip areas extending in the horizontal direction by horizontal dividing lines 12. Each horizontal strip area is projected in the vertical direction, whereby a vertical marginal distribution 22 is extracted as shown in FIG. 2C.

The marginal distributions 21, 22, for the character strings are each constituted by a plurality of histograms. That is, as shown in FIG. 3, in scanning the small area enclosed by the vertical dividing lines 11 so that it is projected in the horizontal direction perpendicular to the vertical dividing line 11, the number of black pixels, which appear on each horizontal scanning line when the document image 10 (character string) within the small area is scanned at predetermined pitches (number of scanning operations that scan a character portion), is expressed as a histogram. Note that the number of the black pixels in a character portion scanned may be counted.

Figure 2C:
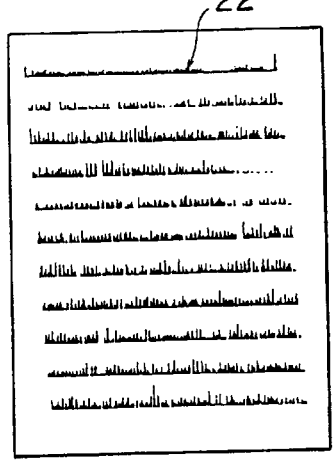
FIG. 2C is a diagram showing vertical marginal distributions obtained from the document image shown in FIG. 2A.
Figure 3:
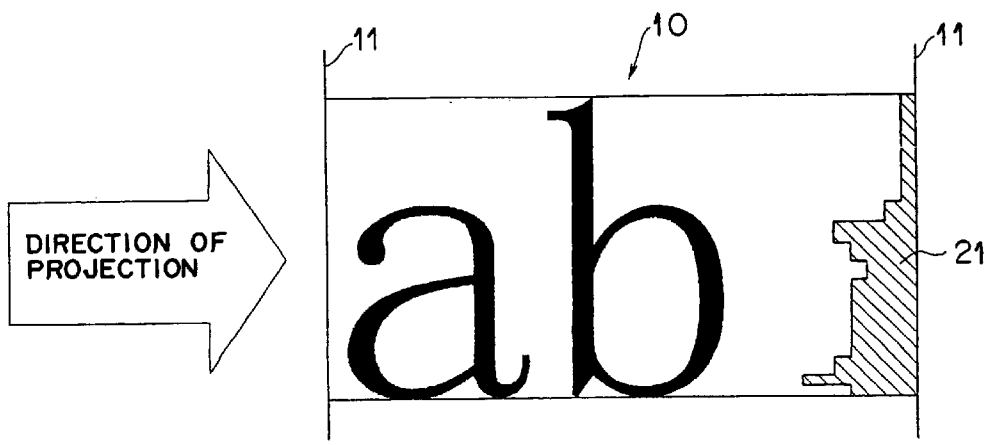
FIG. 3 is a diagram used to explain how each histogram constituting the marginal distribution for a character string is obtained.

The line-direction detection means 302 compares the horizontal marginal distribution 21 shown in FIG. 2B with the vertical peripheral distribution 22 shown in FIG. 2C and recognizes the line direction of the character string of the document image 10. This example is a horizontally written document. Since the horizontal marginal distribution 21 is obtained by scanning (or projecting) character strings in the direction substantially parallel with the line direction, in this horizontal marginal distribution 21 a blank equivalent to a space between lines is present clearly and periodically between the histogram lumps corresponding to each line. On the other hand, since the vertical marginal distribution 22 is obtained by scanning (or projecting) character strings in the direction substantially perpendicular to the line direction, in this vertical marginal distribution 22 a periodic blank such as the aforementioned is not present and horizontally long histograms appear.

As described above, appreciable characteristics corresponding to the line direction of the document image 10 appear in both the horizontal marginal distribution 21 and the vertical marginal distribution 22. Therefore, these characteristics are utilized to detect the line direction. More specifically, in the horizontal marginal distribution 21 and the vertical marginal distribution 22, the number of periodic histogram lumps existing at regular or more intervals (or the number of periodic blanks) is counted. The lump or blank count in the horizontal marginal distribution 21 is compared with that in the vertical marginal distribution 22 and it is judged that the projection direction (or scanning direction) of the marginal distribution 21 or 22 in which the lump or blank count is greater is the line direction of the character string. In the case of FIG. 2A, the aforementioned count is 150 or more for the horizontal marginal distribution 21 (FIG. 2B) and 20 or less for the vertical marginal distribution 22 (FIG. 2C). Because the aforementioned count for the horizontal marginal distribution 21, projected and obtained in the horizontal direction, is greater, the line direction of the character strings of the document image 10 can be judged to be horizontal. Thus, the line-direction detection means 302 sends only the data of the horizontal marginal distribution 21 of FIG. 2B projected and obtained in the horizontal direction to the marginal distribution processing means 303.

Note that for an original in which the document image 10 includes character strings in both the vertical and horizontal directions, there are more character strings in the line direction corresponding to the projection direction of the marginal distribution in which the aforementioned count is greater, and therefore, by sending only the marginal distribution data in that direction to the marginal distribution processing means 303, a high accuracy of inclination detection to be described later becomes possible.

FIG. 4 shows the operation of the marginal distribution correction means 303 and the inclination detection means 304. As previously described, the inclination detection means 304 basically detects the inclination of a straight line linking the central points of the vertical widths (the vertical lengths in FIG. 4) of the histograms constituting the marginal distribution 21, but in the case of an alphabetic document, there are cases where the inclination does not match with the actual inclination. This mismatch is corrected by the marginal distribution correction means 303.

For the above purpose, the marginal distribution correction means 303 performs the marginal distribution correcting process on the marginal distribution 21 sent out from the line-direction detection means 302. FIG. 4A shows part of an alphabetic character string and an example of the marginal distribution 21 for that part. In the case of an alphabetic character string with continuous small letters, the head portion of letter "d" and the leg portion of letter "g", for example, protrude from the basic range (indicated by broken lines) of the character string and therefore the letters constituting the alphabetic character string are not uniform in size. For this reason, if the marginal distribution 21 is utilized as it is, the inclined angle of straight line LO linking the central points S of the histograms of the marginal distribution 21 will not match with the inclination of the actual character string and therefore an error will occur. For that reason, the marginal distribution correction means 303 performs the threshold process on an end portion of each histogram of the marginal distribution 21, thereby removing the end portion when a level on the end portion is less than a predetermined threshold value. As shown in FIG. 4B, the corrected histograms 21a eliminate the influence of the protruding portions of an alphabetic character string such as the aforementioned and correspond to the basic range (indicated by broken lines) of the character string. The inclination of straight line L1 linking the central points S of the corrected histograms 21a becomes matched with the inclination of the character string with a higher degree of accuracy. The marginal distribution 21 constituted by the corrected histograms 21a is sent to the inclination detecting means 304.

The inclination detecting means 304 detects the central positions S, S . . . , and S of adjacent histograms 21a of the marginal distribution 21 judged to belong to a single character string and calculates straight line L1 linking these central positions S as long as possible by the method of least square. The inclination of this straight line L1 is taken as the inclination of the character string. The inclination of such a straight line is calculated for all character strings of the document image 10, and the average value of the calculated inclinations for all character strings is judged to be the inclination of the document image 10.

Note that even if the aforementioned process of correcting the marginal distribution is likewise performed on a Japanese document image, a small amount of protruding portions is removed and there is little influence on the inclination detection of a straight line and in both a Japanese document and an alphabetic document, satisfactory inclination detection can be performed.

What is claimed is:

1. The document-inclination detector comprising:
    marginal distribution extraction means which divides an input document image into a plurality of small areas by a plurality of vertical dividing lines and extracts a horizontal marginal distribution obtained by projecting each small area in a horizontal direction and also divides the input document image into a plurality of small areas by a plurality of horizontal dividing lines and extracts a vertical marginal distribution obtained by projecting each small area in a vertical direction, the horizontal marginal distribution being constituted by histograms obtained by projecting character strings of the document image in the horizontal direction and the vertical marginal distribution being constituted by histograms obtained by projecting the character strings in the vertical direction,
    line-direction detection means which detects a line direction of the document image by comparing the horizontal marginal distribution and vertical marginal distribution extracted by the marginal distribution extraction means,
    marginal distribution correction means which corrects the histograms of the marginal distribution projected in the same direction as the line direction detected by the line-direction detection means, and
    inclination detection means which detects inclination of the document image from a phase shift between the corrected histograms adjacent to each other;
    in which the line-direction detection means compares the number of histograms between periodic blanks in the horizontal marginal distribution with the number of histograms between periodic blanks in the vertical marginal distribution and judges that the projection direction of the marginal distribution in which the number of histograms between periodic blanks is greater is the line direction.

2. The document-inclination detector as defined in claim 1 in which the inclination detection means detects the inclination of the document image from the inclination of a straight line linking the central points of a plurality of the corrected histograms belonging to the same character string.

3. The document-inclination detector as defined in claim 2 in which the inclination detection means detects the inclination of the document image from the inclination of straight lines linking the central points of the corrected histograms belonging to a plurality of character strings.

4. The document-inclination detector as defined in claim 1 in which the marginal distribution correction means performs a threshold detection on an end portion of each histogram of the marginal distribution projected in the same direction as the line direction, thereby removing the end portion when a level on the end portion is less than a predetermined threshold value.

5. The document-inclination detector comprising:
    marginal distribution extraction means which divides an input document image into a plurality of small areas by a plurality of vertical dividing lines and extracts a horizontal marginal distribution obtained by projecting each small area in a horizontal direction and also divides the input document image into a plurality of small areas by a plurality of horizontal dividing lines and extracts a vertical marginal distribution obtained by projecting each small area in a vertical direction, the horizontal marginal distribution being constituted by histograms obtained by projecting character strings of the document image in the horizontal direction and the vertical marginal distribution being constituted by histograms obtained by projecting the character strings in the vertical direction,
    line-direction detection means which detects a line direction of the document image by comparing the horizontal marginal distribution and vertical marginal distribution extracted by the marginal distribution extraction means,
    marginal distribution correction means which corrects the histograms of the marginal distribution projected in the same direction as the line direction detected by the line-direction detection means, and
    inclination detection means which detects inclination of the document image from a phase shift between the corrected histograms adjacent to each other;
    in which the line-direction detection means compares the number of periodic blanks in the horizontal marginal distribution with the number of periodic blanks in the vertical marginal distribution and judges that the projection direction of the marginal distribution in which the number of periodic blanks is greater is the line direction.

6. The document-inclination detector as defined in claim 5 in which the inclination detection means detects the inclination of the document image from the inclination of a straight line linking the central points of a plurality of the corrected histograms belonging to the same character string.

7. The document-inclination detector as defined in claim 6 in which the inclination detection means detects the inclination of the document image from the inclination of straight lines linking the central points of the corrected histograms belonging to a plurality of character strings.

8. The document-inclination detector as defined in claim 5 in which the marginal distribution correction means performs a threshold detection on an end portion of each histogram of the marginal distribution projected in the same direction as the line direction, thereby removing the end portion when a level on the end portion is less than a predetermined threshold value.

* * * * *